July 28, 1959 G. A. WILLIAMS ET AL 2,897,061
CRYSTALLIZATION APPARATUS
Filed Aug. 16, 1956
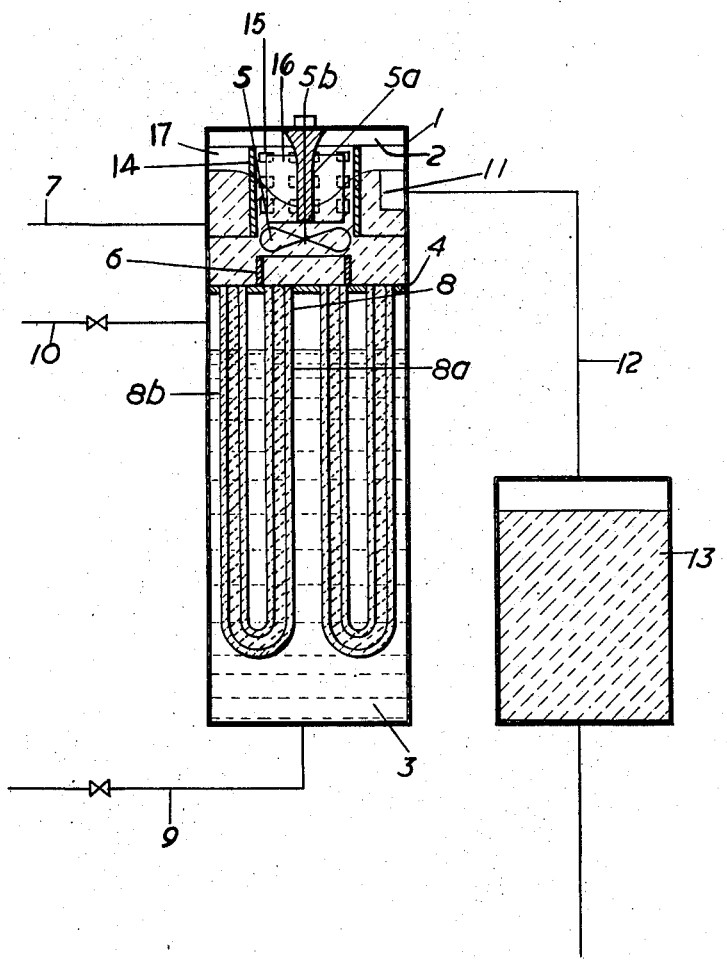
Inventors
Gilbert Arthur Williams
Arthur Firth
By Cushman, Darby & Cushman
Attorneys

United States Patent Office 2,897,061
Patented July 28, 1959

2,897,061
CRYSTALLIZATION APPARATUS

Gilbert Arthur Williams and Arthur Firth, Norton-on-Tees, England, assignors to Imperial Chemical Industries Limited, Millbank, London, England, a corporation of Great Britain Application August 16, 1956, Serial No. 604,396

Claims priority, application Great Britain August 22, 1955

2 Claims. (Cl. 23—273)

This invention relates to crystallization.

According to the present invention there is provided an apparatus adapted for forming crystals from a liquid comprising or containing components capable of forming crystals which comprises: a vessel provided wtih a pumping section bounded at the bottom by a tube plate, which includes in combination feed and discharge pipes, an impeller or other means for moving liquids, and a septum associated with the impeller or said other means; and a cooling section bounded at the top by the tube plate, which includes in combination a chamber for holding coolant and a number of heat transfer tubes depending from the tube plate and extending into the cooling chamber each having two limbs of which one has its orifice in the area of the tube plate falling within the septum and the other has its orifice in the area of the tube plate falling outside the septum.

The apparatus is of special value for forming crystals at temperatures below 0° C., for example, in forming crystals of xylenes or mixed xylenes from liquids containing them, which crystals can then be recovered by filtration or preferably by centrifuging. A particularly valuable application of the apparatus is to the separation by crystallization of xylene enriched in para-xylene, or in substantially pure form, from such mixtures, and it will now be described with particular reference to this application.

A suitable form of apparatus is shown in the accompanying drawing which is a vertical cross section in schematic form. Mixed xylene containing para-xylene, preferably precooled to just above the initial crystallization temperature of the mixture is introduced through pipe 7 to the pumping chamber 2 of the vessel 1. Chamber 2 is provided with an impeller 5 carried on a shaft 5b journalled in the bearing 5a and surrounded by the septum or draught tube 6, of good hydraulic design, and is bounded on the bottom by tube plate 4, which also forms the top of the cooling chamber 3. Cooling chamber 3 contains a number of heat transfer tubes 8, depending from the tube plate 4, preferably of U-shape, having two limbs 8a and 8b each in communication with the chamber 2. The coolant, for example, liquid ethylene or ethane is introduced to chamber 3 through valved pipe 9 and leaves in gaseous form by valved pipe 10.

Operation in relation to the separation of para-xylene is as follows. The mixture of xylenes containing para-xylene, pre-cooled, for example, to −55° C., is introduced through pipe 7 to chamber 2 wherein considerable formation of crystals occurs through shock cooling by contact with the large burden of cooled slurry circulating within the system. The impeller 5 drives the liquid slurry down into the tube coils 8 by the limbs 8a situated within the septum 6 and out through the limbs 8b, the speed of rotation being chosen, e.g. about 1000 r.p.m., so that the mixture flows through the tube coils in fully turbulent manner. A suitably dimensioned tube is for example 1 to 2 inches I.D. and has a wall thickness of, for example, 1/14 to 1/10 inch. With ethylene boiling at e.g. −20° C. to −100° C. it is relatively easy to cool the mixture rapidly down to about −90° C., whereby crystals of para-xylene are rapidly formed. The resulting slurry is taken off continuously from chamber 2, e.g. by overflowing over the baffle 11, and may be conveyed directly to a continuous centrifuge or centrifuges, or to a residence tank 13 for feeding to a batch centrifuge or centrifuges, from which relatively pure para-xylene crystals can be obtained.

Advantages of the apparatus as compared with prior art apparatus which apply in greatest degree to the preferred form are:

(1) The surface area in contact with atmosphere is decreased, largely owing to the location of the pumping chamber and the use of a submerged impeller, and consequently heat leakage is decreased. Most other forms of apparatus comprise a number of separate vessels and pumps and afford greater surface areas in contact with atmosphere.

(2) The need for pipes between the pumping means and the heat exchanger is eliminated and the engineering problem of having to provide for contraction is greatly reduced. Moreover tubes of U-shape are admirably adapted for expansion and contraction.

(3) When, as is preferred, highly efficient impellers are used the frictional heat developed is considerably reduced, as compared with centrifugal pumps.

(4) Because of the design, in particular the provision of a large number of parallel paths formed by the tube coils, there is much lower pressure drop than with conventional apparatus, and pumping rates through the coils can be higher.

(5) Arising from (4) the temperature difference between circulating slurry and refrigerant can be decreased e.g. to about 5° C., and consequently the deposition of crystals in the tubes can be decreased considerably.

(6) The impeller, which preferably has a carbon bearing, is immersed in the cooled mixture, which acts as a lubricant for it, and there are no glands through which xylene can seep. This makes for improved continuous running and the amount of maintenance required is decreased.

(7) The use of single pass U-tubes makes for simpler liquid paths and thus reduces the tendency for choking of the tubes by crystals.

(8) The total energy requirements for effecting crystallization in the apparatus are considerably reduced as compared with previous apparatus used for the purpose.

With heat transfer tubes of 1 to 2 inches bore it is desirable that the liquid magna should have a linear velocity of at least 6 feet per second.

In order to prevent vapour getting into the heat transfer tubes it is desirable that the pumping chamber be provided with a vortex breaker. A suitable form of vortex breaker comprises, for example: an open-ended cylinder 14 of greater diameter than the septum, provided with a number of holes 15; a number, e.g. 4, of baffles 16, situated between the cylinder and the bearing; and a number, e.g. 4, of baffles 17, situated outside the cylinder and staggered in position relatively to those within the cylinder.

We claim:

1. Apparatus for forming a crystalline precipitate from a liquid comprising a pumping chamber bounded at its bottom by a tube plate, a cylindrical septum extending from said tube plate into said pumping chamber and enclosing the central portion of said tube plate, an impeller mounted in said pumping chamber in axial alignment with said septum, a cooling chamber bounded at its top by said tube plate, a plurality of U-shaped cooling tubes disposed in said cooling chamber and communicating with said pumping chamber through said tube plate, each cooling tube having one leg communicating with said pumping chamber inside said septum and the other leg communicating with said pumping chamber outside said septum, a vortex breaker including an open-ended cylinder of greater diameter than said septum in said pumping chamber, said open-ended cylinder being spaced above and arranged in coaxial relation to said septum and having a plurality of holes in its wall.

2. Apparatus as defined in claim 1, including a group of vertically disposed circumferentially spaced baffles extending between the wall of said pumping chamber and said open-ended cylinder, a bearing for said impeller projecting downwardly into said open-ended cylinder, and a second group of circumferentially spaced baffles extending from said bearing toward the wall of said open-ended cylinder and being staggered with relation to the baffles of said first group.

References Cited in the file of this patent

UNITED STATES PATENTS

| | | |
|---|---|---|
| 2,578,192 | Mair | Dec. 11, 1951 |

FOREIGN PATENTS

| | | |
|---|---|---|
| 592,289 | Germany | Feb. 5, 1934 |
| 725,025 | Germany | Sept. 11, 1942 |